(12) United States Patent
Shen et al.

(10) Patent No.: US 11,615,545 B2
(45) Date of Patent: *Mar. 28, 2023

(54) SYSTEM AND METHOD FOR DETECTING IN-VEHICLE CONFLICTS

(71) Applicant: BEIJING DIDI INFINITY TECHNOLOGY AND DEVELOPMENT CO., LTD., Beijing (CN)

(72) Inventors: Haifeng Shen, Beijing (CN); Yuan Zhao, Beijing (CN)

(73) Assignee: BEJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 260 days.

This patent is subject to a terminal disclaimer.

(21) Appl. No.: 17/144,136

(22) Filed: Jan. 7, 2021

(65) Prior Publication Data

US 2021/0133467 A1 May 6, 2021

Related U.S. Application Data

(63) Continuation of application No. 16/232,035, filed on Dec. 25, 2018, now Pat. No. 10,922,564, which is a
(Continued)

(51) Int. Cl.
*G06T 7/00* (2017.01)
*G06T 7/55* (2017.01)
(Continued)

(52) U.S. Cl.
CPC .............. *G06T 7/55* (2017.01); *G06F 18/211* (2023.01); *G06T 7/11* (2017.01); *G06V 10/752* (2022.01);
(Continued)

(58) Field of Classification Search
CPC .... G06V 20/59; G06V 40/103; G06V 10/752; G06V 20/44; G06V 20/647;
(Continued)

(56) References Cited

U.S. PATENT DOCUMENTS

2004/0178894 A1 9/2004 Janssen
2012/0056982 A1 3/2012 Kjatz et al.
(Continued)

FOREIGN PATENT DOCUMENTS

CN 2411936 Y 12/2000
CN 101625793 A 1/2010
(Continued)

OTHER PUBLICATIONS

Notice of Reasons for Refusal issued in corresponding Japanese Patent Application No. 2018-566825, 6 pages.
(Continued)

*Primary Examiner* — Ping Y Hsieh
(74) *Attorney, Agent, or Firm* — Bayes PLLC

(57) ABSTRACT

Embodiments of the disclosure provide a method for detecting an inter-person conflict. The method includes receiving at least one image from an image data resource, where the at least one image is captured by at least one camera. The method further includes detecting human objects from the at least one image. The method additionally includes determining a distance between two of the detected human objects. The method additionally includes determining whether there is a conflict between the two of the detected human objects based on the determined distance.

20 Claims, 5 Drawing Sheets

Related U.S. Application Data continuation of application No. PCT/CN2018/114681, filed on Nov. 9, 2018.

(51) Int. Cl.
| | |
|---|---|
| *G06T 7/11* | (2017.01) |
| *G06V 20/59* | (2022.01) |
| *G06V 40/10* | (2022.01) |
| *G06F 18/211* | (2023.01) |
| *G06V 10/75* | (2022.01) |
| *G06V 20/64* | (2022.01) |
| *G06V 20/40* | (2022.01) |

(52) U.S. Cl.
CPC ............ *G06V 20/59* (2022.01); *G06V 20/647* (2022.01); *G06V 40/103* (2022.01); *G06T 2207/20076* (2013.01); *G06T 2207/30196* (2013.01); *G06T 2207/30268* (2013.01); *G06V 20/44* (2022.01)

(58) Field of Classification Search
CPC ........... G06K 9/6228; G06T 7/11; G06T 7/55; G06T 2207/20076; G06T 2207/30196; G06T 2207/30268; G06T 2207/10012; G06T 2207/20081; G06T 2207/20084; G06T 2207/30232

See application file for complete search history.

(56) References Cited

U.S. PATENT DOCUMENTS

| | | | |
|---|---|---|---|
| 2015/0086108 | A1 | 3/2015 | Craig et al. |
| 2016/0098603 | A1 | 4/2016 | Kim et al. |
| 2016/0214485 | A1 | 7/2016 | Butzmann |
| 2017/0249718 | A1 | 8/2017 | Wunderlich et al. |
| 2017/0351928 | A1 | 12/2017 | Yamanaka et al. |
| 2018/0211543 | A1* | 7/2018 | Wei ......................... G06V 20/59 |
| 2018/0284798 | A1 | 10/2018 | Kita et al. |
| 2020/0079396 | A1* | 3/2020 | Beaurepaire ...... G06F 16/24575 |
| 2020/0082287 | A1* | 3/2020 | Beaurepaire ........... G06N 5/047 |
| 2020/0171977 | A1* | 6/2020 | Jales Costa ............ B60N 2/002 |

FOREIGN PATENT DOCUMENTS

| | | |
|---|---|---|
| CN | 202242887 U | 5/2012 |
| CN | 103544820 A | 1/2014 |
| CN | 104156737 A | 11/2014 |
| CN | 104166841 A | 11/2014 |
| CN | 105243838 A | 1/2016 |
| CN | 107451524 A | 12/2017 |
| CN | 108694363 A | 10/2018 |
| CN | 108694958 A | 10/2018 |
| EP | 3 144 850 A1 | 3/2017 |
| JP | 61119580 A | 6/1986 |
| JP | 2008237625 A | 10/2008 |
| JP | 2008260474 A | 10/2008 |
| JP | 3151780 U | 7/2009 |
| JP | 6074114 B2 | 2/2017 |
| KR | 20080045101 A | 5/2008 |
| TW | 201529385 A | 8/2015 |

OTHER PUBLICATIONS

Suzuki, Takashi, et al., "An attempt to detect suspicious behavior of a passenger based on a surveillance image in the passenger compartment", a proceedings of the two thousand tenth winter meeting of the video information media society [CD-ROM] video information media society, Japan, Society Video Information Media Society, Nov. 26, 2010, Japan, Society video information media society, Nov. 2010, 9 pages.

Extended European Search Report issued in corresponding European Patent Application No. 18815096.5-12007, dated Oct. 20, 2020, 8 pages.

Zhong, Yiran et al., "Self-Supervised Learning for Stereo Matching with Self-Improving Ability", Australian National University, Australian Centre for Robotic Vision, Data61, arXiv:1709.00930v1 [cs.CV] Sep. 4, 2017, 13 pages.

Park S. U. et al., A Depth Camera-based Human Activity Recognition via Deep Learning Recurrent Neural Network for Health and Social Care Services, Procedia Computer Science. 100. 76-84, 2016.

Examination Report in Canadian Application No. 3028170, dated Mar. 3, 2020, 5 pages.

International Search Report in PCT/CN2018/114681, dated Jul. 31, 2019, 5 pages.

Written Opinion in PCT/CN2018/114681, dated Jul. 31, 2019, 4 pages.

First Office action issued in corresponding Chinese Application No. 201880002586.1, dated Dec. 7, 2021, 21 pages.

First Examination Report issued in corresponding India Application No. 201817048531, dated Jun. 23, 2021, 6 pages.

\* cited by examiner

SYSTEM AND METHOD FOR DETECTING IN-VEHICLE CONFLICTS

CROSS-REFERENCE TO RELATED APPLICATION

This application is a Continuation of U.S. application Ser. No. 16/232,035, filed on Dec. 25, 2018, which is a Continuation of International Application No. PCT/CN2018/114681, filed on Nov. 9, 2018, both of which are incorporated herein by reference in their entireties.

TECHNICAL FIELD

The present disclosure relates to a conflict detection system and method, and more particularly to, a system and method for automatically detecting a conflict between two vehicle occupants, e.g., a driver and a passenger, in a ride-hailing service vehicle.

BACKGROUND

An online hailing platform (e.g., DiDi™ online) can receive a rideshare service request from a passenger and then route the service request to at least one transportation service provider (e.g., a taxi driver, a private car owner, or the like). After the transportation service request is answered by the driver, the driver will pick up the passenger, and drive the passenger to the requested destination.

Because the driver and the passenger otherwise do not know each other, conflict may occur between the two during the trip. For example, the driver and the passenger may disagree about the route the driver takes for the trip or the fees charged for the service. Sometimes, the driver or the passenger may attempt to commit crimes against the other, such as assault, battery, or sexual harassment. In-vehicle conflicts therefore impose safety threats to the driver and/or the passenger.

Existing in-vehicle conflict detection methods rely on the driver or the passenger's report, e.g., by pressing a button on their phone, to notify the online hailing platform or the law enforcement of the conflict. For example, the DiDi™ ride-hailing provides an "one-button police call" feature that allows the occupant (e.g., the driver or the passenger) to call the police with one press on their respective terminal. The service platform or the police may intervene by warning the parties involved in the conflict.

However, as these detection methods are triggered by users' manual inputs, they are not reliable. For example, the parties involved in conflict tend to hold off the reporting until it is too late. Also, when the vehicle is at a place with poor signal, it may not be possible for one to make such a report.

Embodiments of the disclosure address the above problems by automatically detect the driver-passenger conflict using images captured by at least one camera inside the vehicle.

SUMMARY

Embodiments of the disclosure provide a system for detecting a conflict in a vehicle. The system includes at least one camera, which is configured to capture a plurality of images in the vehicle. The system further includes a controller in communication with the at least one camera. The controller is configured to detect human objects from the plurality of images, estimate depth information of the respective human objects, and detect the conflict based on the depth information.

Embodiments of the disclosure also provide a method for detecting a conflict in a vehicle. The method includes capturing, by at least one camera, a plurality of images in the vehicle. The method further includes detecting, by a processor, human objects from the plurality of images. The method also includes estimating, by the processor, depth information of the respective human objects, and detecting, by the processor, the conflict based on the depth information.

Embodiments of the disclosure further provide a non-transitory computer-readable medium that stores a set of instructions. When executed by at least one processor of an electronic device, the set of instructions cause the electronic device to perform a method for detecting a conflict in a vehicle. The method includes receiving a plurality of images in the vehicle captured by at least one camera. The method further includes detecting human objects from the plurality of images. The method also includes estimating depth information of the respective human objects, and detecting the conflict based on the depth information.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
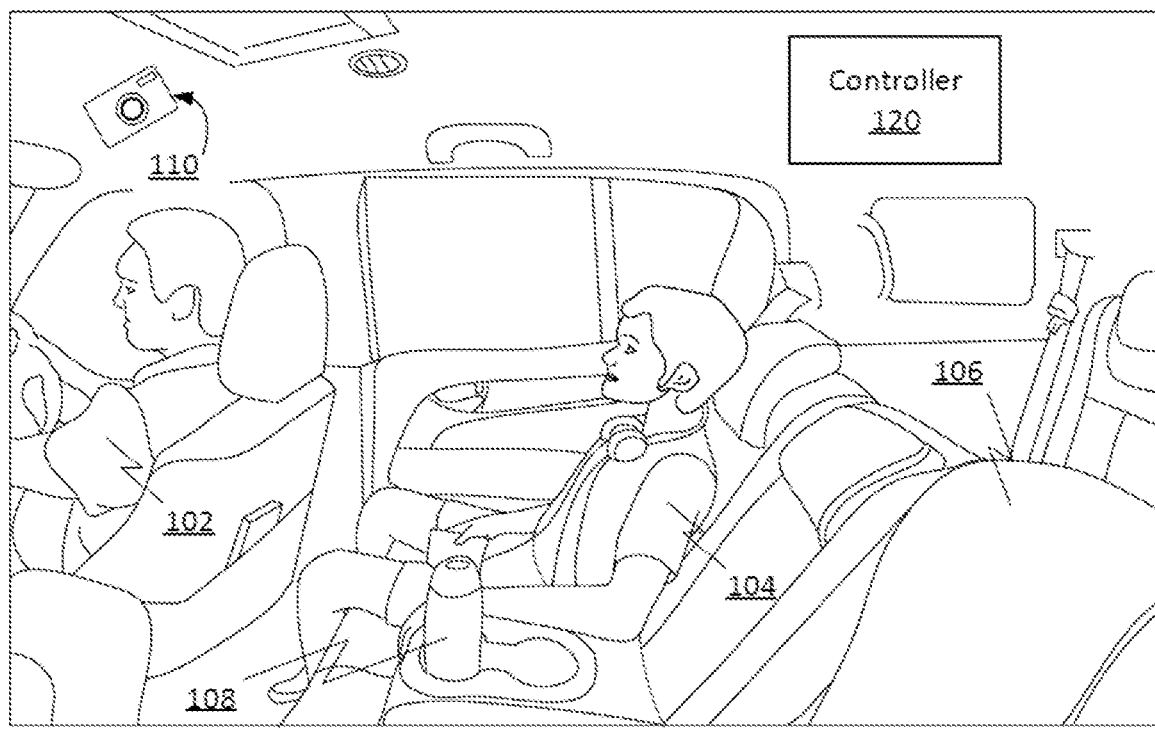
FIG. 1 illustrates a schematic diagram of an exemplary interior of a vehicle equipped with a conflict detection system, according to embodiments of the disclosure.

FIG. 1 illustrates a schematic diagram of an exemplary vehicle 100 equipped with a conflict detection system, according to embodiments of the disclosure. Consistent with some embodiments, vehicle 100 may be configured to be operated by an operator occupying the vehicle, remotely controlled, and/or autonomous. It is contemplated that vehicle 100 may be an electric vehicle, a fuel cell vehicle, a hybrid vehicle, or a conventional internal combustion engine vehicle. Vehicle 100 may have a body that may be any body style, such as a sports vehicle, a coupe, a sedan, a pick-up truck, a station wagon, a sports utility vehicle (SUV), a minivan, or a conversion van.

As shown in FIG. 1, the interior of vehicle 100 surrounded by the body may include one or more rows of seats to accommodate people inside the vehicle. For example, the front-row seats may accommodate a driver 102, and a passenger (not show). The back-row seats 106 may accommodate one or more passengers, such as a passenger 104. Vehicle 100 may include more than two rows of seats to accommodate more passengers. In some embodiments, an arm rest or a cup holder may be installed between the seats. For example, a cup holder may accommodate a water bottle 108.

As illustrated in FIG. 1, vehicle 100 may be equipped with a conflict detection system, including, among other things, at least one camera 110 and a controller 120. Camera 110 may be mounted or otherwise installed inside vehicle 100. In some embodiments, camera 110 may be installed on the dashboard, above the windshield, on the ceiling, in the corner, etc. In some embodiments, camera 110 may be integrated in a mobile device, such as a mobile phone, a tablet, or a global positioning system (GPS) navigation device mounted on the dashboard of vehicle 100. In some embodiments, camera 110 may be configured to capture images inside vehicle 100 when vehicle 100 is fulfilling a service trip. Consistent with the present disclosure, cameras 110 may be a digital camera or a digital video camera configured to take pictures or videos of the interior of vehicle 100. The images may capture various objects inside vehicle 100, such as driver 102, passenger 104, empty seat 106, and water bottle 108.

In some embodiments, multiple cameras 110 may be installed at different locations inside vehicle 100 and take pictures of the interior from different view angles. As vehicle 100 travels towards the destination, camera 110 may continuously capture images. Each image captured at a certain time point is known as an image frame. For example, camera 110 may record a video consisting of multiple image frames captured at multiple time points.

In some embodiments, camera 110 may include cameras configured with different camera settings in order to provide depth information of the objects captured in the images. For example, each camera may have a different focal length, or angle of view. Collectively, the multiple cameras may keep the relevant image space in focus and would mitigate the artifacts introduced by lens imperfections. For example, camera 110 may include cameras with focal lengths at 20 cm, 30 m, 50 cm, and 100 cm, etc. Therefore, a particular camera may cover a preset depth range and objects within the respective depth range may be in focus with that camera. As a result, the entire image space within vehicle 100 may be in focus.

Returning to FIG. 1, in some embodiments, camera 110 may communicate with controller 120. In some embodiments, controller 120 may be a controller onboard of vehicle 100, e.g., the electronic control unit. In some embodiments, controller 120 may be part of a local physical server, a cloud server (as illustrated in FIG. 1), a virtual server, a distributed server, or any other suitable computing device. Controller 120 may communicate with camera 120, and/or other components of vehicle 100 via a network, such as a Wireless Local Area Network (WLAN), a Wide Area Network (WAN), wireless networks such as radio waves, a cellular network, a satellite communication network, and/or a local or short-range wireless network (e.g., Bluetooth™).

Consistent with the present disclosure, controller 120 may be responsible for processing images captured by cameras 110 and detect an in-vehicle conflict based on the images. In some embodiments, controller 120 may identify human objects, such as driver 102 and one or more passengers 104, using various image processing methods. For example, controller 120 may perform image segmentation and object classification methods to identify the human objects. In some embodiments, controller 120 may estimate depth information of the identified human objects. For example, the depth information characterizes a depth range a human object is in. The depth information may be estimated using a machine learning method based on a learning model, e.g., a convolutional neural network (CNN) model.

Vehicle occupants, such as the driver and the passenger or any two passengers, normally should not have any contact. A conflict may have occurred between two vehicle occupants, e.g., between the driver and the passenger, if the human objects corresponding to the occupants (e.g., a driver object and a passenger object) overlap with each other, or sufficiently close to each other. Therefore, a driver-passenger conflict may be detected based on the relative position of a driver object and a passenger object determined using the depth information. For example, controller 120 may calculate a probability of the conflict and determine that the conflict has occurred when the probability is higher than a predetermined threshold. In some embodiments, when a conflict is detected, controller 120 may automatically notify the service platform or the police for them to intervene and resolve the conflict.

Figure 2:
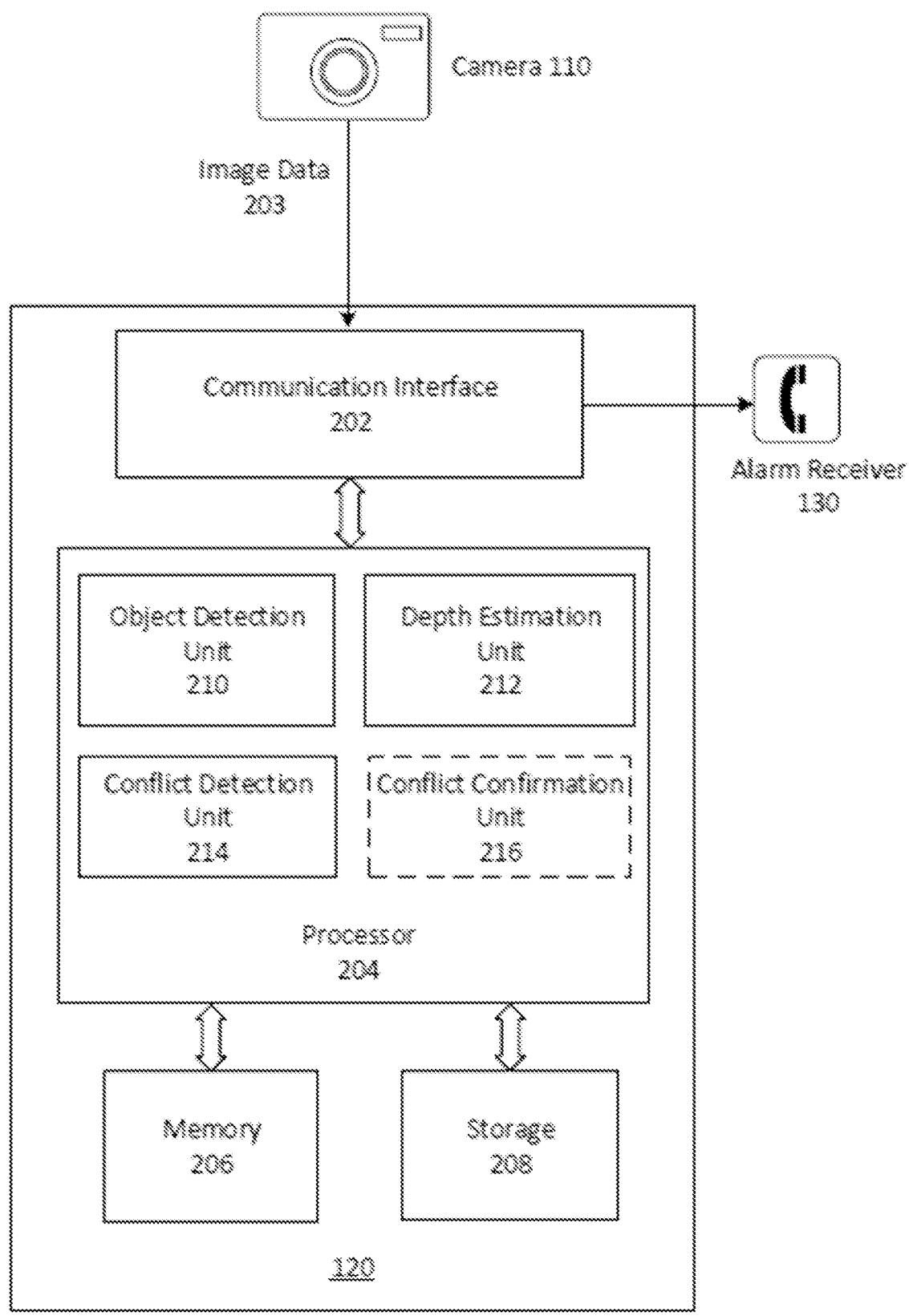
FIG. 2 illustrates a block diagram of an exemplary controller, according to embodiments of the disclosure.

For example, FIG. 2 illustrates a block diagram of an exemplary controller 120, according to embodiments of the disclosure. Consistent with the present disclosure, controller 120 may receive image data 203 from one or more camera 110. In some embodiments, image data 203 may contain two-dimensional (2D) images or three-dimensional (3D) images. In some embodiments, when multiple cameras 110 are installed at different locations inside vehicle 100, image data 203 may contain image data captured from different view angles.

Controller 120 may identify human objects from image data 203, estimate depth of the human object using image data 203, and detect a driver-passenger conflict in vehicle 100 using the depth information. In some embodiments, as shown in FIG. 2, controller 120 includes a communication interface 202, a processor 204, a memory 206, and a storage 208. In some embodiments, controller 120 includes different modules in a single device, such as an integrated circuit (IC) chip (implemented as an application-specific integrated circuit (ASIC) or a field-programmable gate array (FPGA)), or separate devices with dedicated functions. In some embodiments, one or more components of controller 120 may be located in a cloud, or may be alternatively in a single location (such as inside vehicle 100 or a mobile device) or distributed locations. Components of controller 120 may be in an integrated device, or distributed at different locations but communicate with each other through a network (not shown).

Communication interface 202 may send data to and receive data from components such as camera 110 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 202 can be an integrated services digital network (ISDN) card, cable modem, satellite modem, or a modem to provide a data communication connection. As another example, communication interface 202 can be a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information via a network.

Consistent with some embodiments, communication interface 202 may receive image data 203 captured by cameras 110. Communication interface 202 may further provide the received data to storage 208 for storage or to processor 204 for processing.

Processor 204 may include any appropriate type of general-purpose or special-purpose microprocessor, digital signal processor, or microcontroller. Processor 204 may be configured as a separate processor module dedicated to performing in-vehicle conflict detection based on image data captured by cameras 110. Alternatively, processor 204 may be configured as a shared processor module for performing other functions.

As shown in FIG. 2, processor 204 includes multiple modules, such as an object detection unit 210, a depth estimation unit 212, and a conflict detection unit 214, and the like. In some embodiments, processor 204 may additionally include a conflict confirmation unit 216. These modules (and any corresponding sub-modules or sub-units) can be hardware units (e.g., portions of an integrated circuit) of processor 204 designed for use with other components or software units implemented by processor 204 through executing at least part of a program. The program may be stored on a computer-readable medium, and when executed by processor 204, it may perform one or more functions. Although FIG. 2 shows units 210-216 all within one processor 204, it is contemplated that these units may be distributed among multiple processors located near or remotely with each other.

Figure 3:
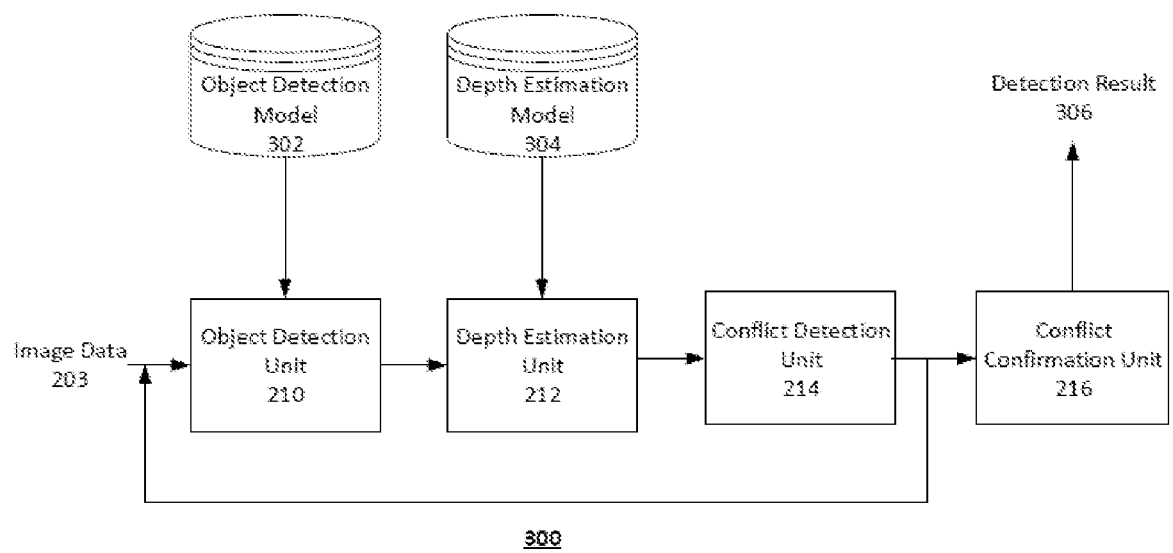
FIG. 3 illustrates a data flow diagram of an exemplary processor in the controller illustrated in FIG. 2, according to embodiments of the disclosure.

FIG. 3 illustrates a data flow diagram 300 of processor 204 in controller 120 illustrated in FIG. 2, according to embodiments of the disclosure. As shown in FIG. 3, object detection unit 210 may receive image data 203 from communication interface 202 and be configured to identify human objects inside vehicle 100 from image data 203. Image segmentation and object detection methods may be applied to identify the human objects. In some embodiments, the human objects may be identified by determining their contour information.

In some embodiments, object detection unit 210 may apply segmentation first on image data 203 to identify objects from the images. The objects identified through image segmentation may include various objects inside vehicle 100, e.g., human objects, empty seats, bags, seat belts, bottles or cups placed in the cup holders, as well as other objects that may be installed or brought into vehicle 100. Object detection unit 210 may then use object detection model 302 to detect human objects among the identified objects. In some embodiments, object detection model 302 may be a machine learning model, such as a CNN model, trained using training images and corresponding human objects in those images.

In some alternative embodiments, object detection unit 210 may perform object detection first using object detection model 302. For example, object detection unit 210 may determine bounding areas containing human objects from image data 203. The bounding areas may be in any suitable shape, such as rectangular, square, circular, oval, diamond, etc. Image segmentation is then applied to segment each bounding area to identify the human objects.

Figure 4:
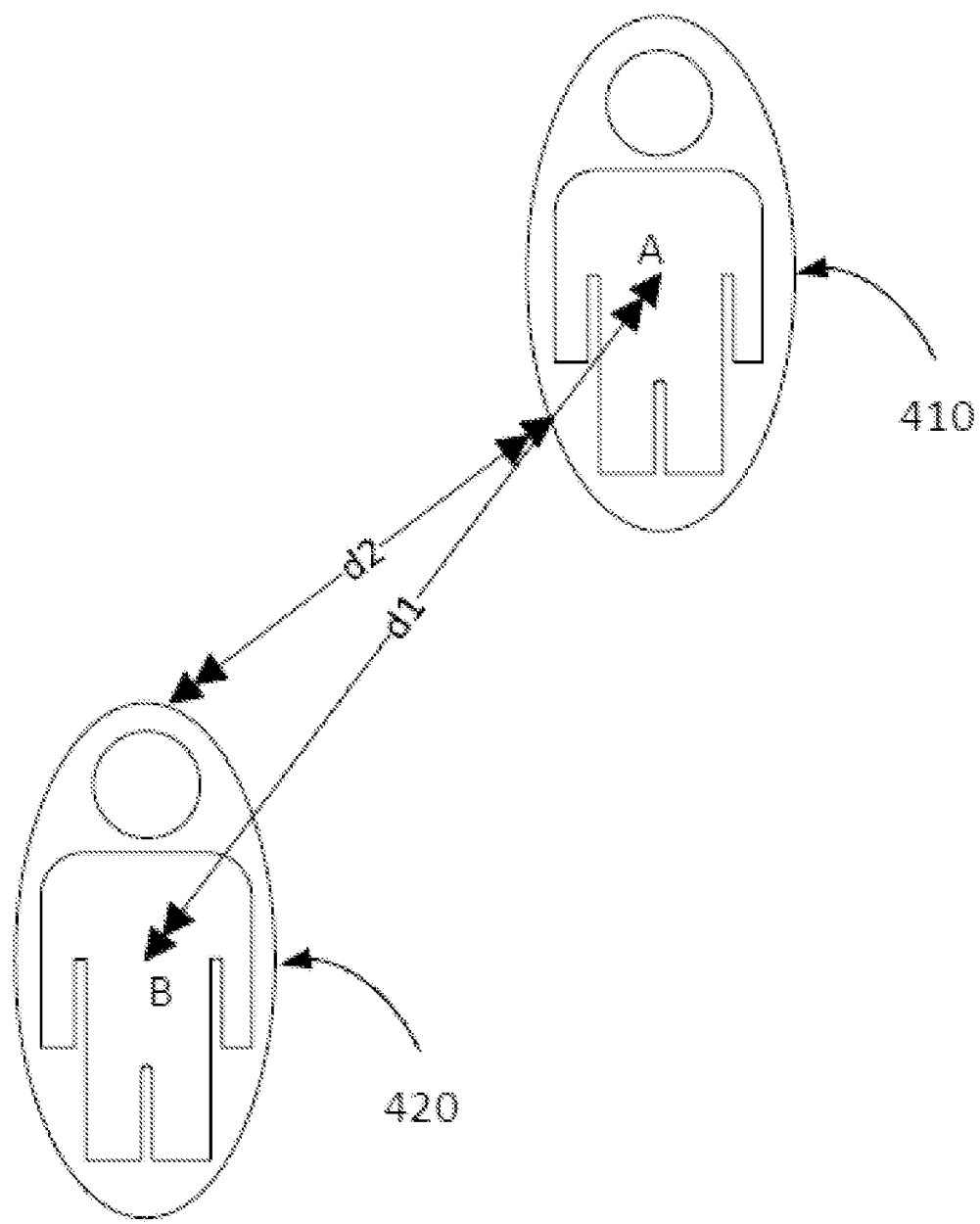
FIG. 4 illustrates an exemplary method for detecting a conflict between a driver and a passenger, according to embodiments of the disclosure.

The identified human objects, e.g., their contour information is forwarded to depth estimation unit 212. Depth estimation unit 212 is configured to estimate the depth information of the human objects. The depth information may include, e.g., a distance between camera 110 and the human objects. Because a human object is 3D and has its own depth, the depth information may include a depth range of the human object. In some embodiments, depth estimation unit 212 may apply a depth estimation model 304 to estimate the depth information. Depth estimation model 304 may be a machine learning model, such as CNN, trained using training objects and their corresponding depth attributes. In some embodiments, depth estimation unit 212 may alternatively or additionally use multiple focused images from real aperture cameras to estimate the depth information (known as a "depth-from-focus" method). Using the object contours determined by object detection unit 210 and their depth information, depth estimation unit 212 may obtain an object region for each human object. The object region may be a 3D region. For example, a driver object region and a passenger object region may be determined corresponding to a driver A and a passenger B, as shown in FIG. 4.

The object regions determined by depth estimation unit 212 may be forwarded to conflict detection unit 214. Conflict detection unit 214 may be configured to detect a conflict between a driver and a passenger. For example, FIG. 4 illustrates an exemplary method for detecting a conflict between driver A and passenger B. As shown in FIG. 4, a driver object region 410 and a passenger object region 420 are non-overlapping under normal conditions. When a conflict occurs between driver A and passenger B, the two objects may lean towards each other and thus object regions 410 and 420 may overlap, in contact, or become sufficiently close to each other.

In some embodiments, conflict detection unit 214 may determine whether a conflict has likely occurred based on a relative position of object regions 410 and 420. In some embodiments, a distance between object regions 410 and 420 may be calculated and a probability of conflict may be calculated based on the distance. For example, conflict detection unit 214 may determine center points of object regions 410 and 420 and calculate a distance $d_1$ between the center points. Distance $d_1$ may be determined as $d_1=|x_{dc}-x_{pc}|$ where $x_{dc}$ is the center point of driver object region 410, and $x_{pc}$ is the center point of passenger object region 420. Accordingly, the conflict probability $P_c$ may be determined as a function of the distance $d_1$. In some embodiments, the conflict probability $P_c$ may be inversely proportional to the distance $d_1$. In other words, the shorter the distance, the greater the probability of conflict. For example, conflict detection unit 214 may determine $P_c$ according to Equation (1).

$$P_c = f_1(1/|x_{dc}-x_{pc}|) \qquad (1)$$

where $x_{dc}$ is the center point of driver object region 410, $x_{pc}$ is the center point of passenger object region 420, and $P_c$ is the conflict probability.

As another example, conflict detection unit 214 may determine points of object regions 410 and 420 that are nearest to each other and calculate a distance $d_2$ between the nearest points. Distance $d_2$ may be determined as $d_2=|x_{dn}-x_{pn}|$, where $x_{dn}$ and $x_{pn}$ are points of object regions 410 and 420 that are nearest to each other. When object regions 410 and 420 overlap (i.e., driver A and passenger B are in contact), distance $d_2$ becomes 0. Conflict detection unit 214 may then calculate conflict probability $P_n$ may be determined as a function of the distance $d_2$. In some embodiments, the conflict probability $P_n$ may also be inversely proportional to the distance $d_2$. For example, conflict detection unit 214 may determine $P_n$ according to Equation (2).

$$P_n = f_2\left(\frac{1}{|x_{dn} - x_{pn}|}\right) \qquad (2)$$

where $x_{dn}$ and $x_{pn}$ are points of regions 410 and 420 that are nearest to each other, and $P_n$ is the conflict probability.

As yet another example, conflict detection unit 214 may aggregate the depth information and the distance in determining the conflict probability. If the depth information Map(d, i) associated with driver object region 410 and depth information Map(p, j) associated with passenger object region 420 are similar, i.e., Map(d, i)–Map(p, j)≤δ, and the distance between object regions 410 and 420 is short, the probability of conflict is high. Otherwise, if Map(d, i) and Map(p, j) are rather different, and the distance between object regions 410 and 420 is short, the probability of conflict is determined low. The "distance" taken into consideration by conflict detection unit 214 may be the distance between the center points or the distance between the nearest points of object regions 410 and 420, as described above. For example, the conflict probabilities can be determined based on these distances, respective, according to Equations (3) and (4).

$$P_{map1} = f_4\left(\frac{1}{\min|\text{Map}(d, i) - \text{Map}(p, j)|} \frac{1}{|x_{dc} - x_{pc}|}\right) \qquad (3)$$

$$P_{map2} = f_4\left(\frac{1}{\min|\text{Map}(d, i) - \text{Map}(p, j)|} \frac{1}{|x_{dn} - x_{pn}|}\right). \qquad (4)$$

Based on the determined conflict probability, conflict detection unit 214 may determine if a conflict has occurred or will likely occur between driver A and passenger B. For example, conflict detection unit 214 compares the conflict probability with a preset threshold, e.g., 0.8, 0.9, 0.95, etc. If the probability exceeds the threshold, conflict detection unit 214 may detect the conflict.

In some embodiments, conflict detection unit 214 may use a learning model-based method to detect conflict based on the depth information obtained by depth estimation unit 212. The learning model may determine the conflict probability, or directly return a binary detection result, i.e., "conflict" or "no conflict." The learning model may be trained using image data that associated with known conflict (or no conflict) situations. Although FIG. 4 illustrates detection of a conflict between a driver and a passenger, it is contemplated that a conflict between two passengers may be similarly detected.

Referring back to FIG. 3, in some embodiments, the detection result of conflict detection unit 214 may be confirmed by conflict confirmation unit 216. If a conflict is detected based on image data acquired at a particular time point or over a short time period, the detection result may not be reliable. For example, passenger 104 may occasionally lean over to driver 102 for the ease of conversation, or to pass information or an item, such as a piece of paper with the destination address, a mobile phone that shows trip information, etc. Therefore, conflict confirmation unit 216 may be configured to confirm the conflict and reduce the likelihood of false alarm. In some embodiments, conflict confirmation unit 216 may generate control signals to cause camera 110 to acquire more images over a relatively long time period, e.g., 10, 20 or 30 seconds. Alternatively, if camera 110 captures a video containing multiple image frames, conflict confirmation unit 216 may sample image frames in a span of time, e.g., 10, 20 or 30 seconds. Conflict confirmation unit 216 may repeat the detection process performed by units 210-214 for each image frame. If the conflict is detected persistently across the sampled image frames, conflict confirmation unit 216 may confirm the conflict and return detection result 306. If the conflict detection is sporadic and analyses of other image frames show that no conflict exists, conflict confirmation unit 216 may disregard the conflict finding and not return detection result 306.

Referring back to FIG. 2, if a conflict is detected, processor 204 may generate a control signal to trigger an alarm and send the control signal to an alarm receiver 130 via communication interface 202. In some embodiments, alarm receiver 130 may be a conflict resolution module of the service platform, or a server/controller of a police department. In some embodiments, the control signal may trigger a phone call to alarm receiver 130. In some other embodiments, the control signal may trigger a data transmission, including, e.g., vehicle registration information, driver information, passenger information, vehicle location, and images that can show the conflict, to alarm receiver 130. In yet some other embodiments, the control signal may cause a warning notice to be generated by alarm receiver 130, such as a pop-out window on a display screen of alarm receiver 130, a beeping sound, vibrating, or an audio alarm, etc.

Memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform image data processing and conflict detection disclosed herein. For example, memory 206 and/or storage 208 may be configured to store program(s) that may be executed by processor 204 to identify human objects from image data, estimate depth information of the human objects, and detect a conflict based on the depth information.

Memory 206 and/or storage 208 may be further configured to store information and data used by processor 204. For instance, memory 206 and/or storage 208 may be configured to store the various types of data (e.g., image data 203) captured by camera 110 and data related to camera setting. Memory 206 and/or storage 208 may also store intermediate data such as the estimated depth information by depth estimation unit 212. Memory 206 and/or storage 208 may further store the various learning models used by processor 204, such as object detection model 302 and depth estimation model 304. The various types of data may be stored permanently, removed periodically, or disregarded immediately after each frame of data is processed.

Figure 5:
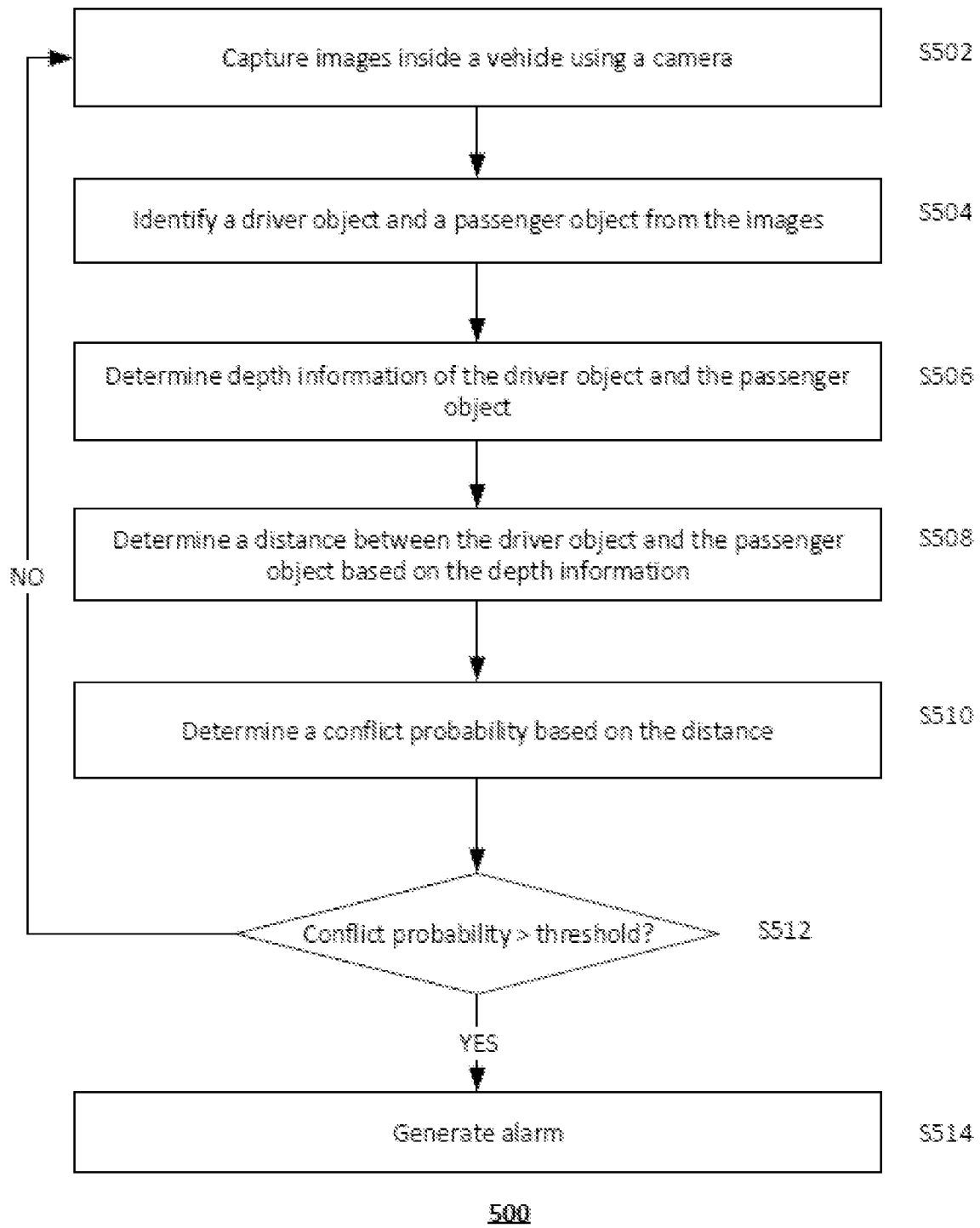
FIG. 5 illustrates a flowchart of an exemplary method for detecting a conflict in a vehicle, according to embodiments of the disclosure.

FIG. 5 illustrates a flowchart of an exemplary method 500 for detecting a conflict in a vehicle, according to embodiments of the disclosure. In some embodiments, method 500 may be implemented by controller 120 that includes, among other things, processor 204. However, method 500 is not limited to that exemplary embodiment. Method 500 may include steps S502-S514 as described below. It is to be appreciated that some of the steps may be optional to perform the disclosure provided herein. Further, some of the steps may be performed simultaneously, or in a different order than shown in FIG. 5.

In step S502, camera 110 captures image data 203 of at least one object within vehicle 100 when vehicle 100 is fulfilling a service trip. In some embodiments, multiple cameras 110 may be installed at various places inside vehicle 110 and capture image data simultaneously from different angles. For example, camera 110 may be a backward-facing camera installed at the dashboard of vehicle 100 or embedded in a GPS navigation device or cell phone mounted on the dashboard of vehicle 100. In some embodiments, the objects may include a driver (e.g., driver 102), one or more passengers (e.g., passenger 104), empty seats (e.g., empty seat 106), seat belts, and any other items installed inside vehicle 100 or brought into vehicle 100 (e.g., water bottle 108).

Camera 110 may be configured to capture image data 203 continuously or at certain time points. For example, camera 110 may be a video camera configured to capture a video containing multiple image frames. In some embodiments, image data 203 may contain 2D images and/or 3D images. Image data 203 captured by camera 110 may be transmitted to controller 120, e.g., via a network.

In step S504, controller 120 identifies a driver object and a passenger object from the images within image data 203. In some embodiments, these human objects may be identified by determining their contour information. In some embodiments, object detection unit 210 may apply image segmentation first on image data 203 to identify objects from the images, and then use object detection model 302 to detect human objects among the identified objects. In some alternative embodiments, object detection unit 210 may perform object detection first using object detection model 302, to determine bounding areas containing human objects, and then segment each bounding area to identify the human objects.

In step S506, controller 120 determines depth information of the driver object and the passenger object. In some embodiments, controller 120 may apply a depth estimation model 304 to estimate the depth information. Using the object contours determined in step S504 and the depth information, controller 120 may obtain an object region for each human object. For example, a driver object region 410 and a passenger object region 420 may be determined corresponding to a driver A and a passenger B, as shown in FIG. 4.

In step S508, controller 120 determines a distance between the driver object and the passenger object. In some embodiments, controller 120 may determine center points of the object regions and calculate a distance $d_1$ between the center points. For example, as shown in FIG. 4, distance $d_1$ may be determined as $d_1=|x_{dc}-x_{pc}|$ where $x_{dc}$ is the center point of driver object region 410, and $x_{pc}$ is the center point of passenger object region 420. Distance $d_1$ may be determined as $d_1=|x_{dc}-x_{pc}|$ where $x_{dc}$ is the center point of driver object region 410, and $x_{pc}$ is the center point of passenger object region 420. Alternatively, controller 120 may determine points of object regions 410 and 420 that are nearest to each other and calculate a distance $d_2$ between the nearest points. For example, distance $d_2$ may be determined as $d_2=|x_{dn}-x_{pn}|$, where $x_{dn}$ and $x_{pn}$ are points of regions 410 and 420 that are nearest to each other.

In step S510, controller 120 determines a conflict probability based on the distance. For example, a conflict probability $P_c$ may be determined as a function of the distance $d_1$ according to Equation (1). As another example, a conflict probability $P_n$ may be determined as a function of the distance $d_2$ according to Equation (2). In some embodiments, the conflict probability $P_c$ and $P_n$ may be inversely proportional to the distance $d_1$ and $d_2$, respectively.

In some other embodiments, controller 120 may aggregate the depth information and the distance in determining the conflict probability. If the depth information Map(d, i) associated with driver object region 410 and depth information Map(p, j) associated with passenger object region 420 are similar, i.e., Map(d, i)−Map(p, j)≤δ, the conflict probability can be determined according to Equation (3) or (4). In some embodiments, controller 120 may use a learning model-based method to detect conflict based on the depth information.

In step S512, controller 120 may compare the conflict probability with a preset threshold. For example, the threshold may be set as significantly high, such as 0.8, 0.9. or 0.95. threshold. If the probability exceeds the threshold (S512: yes), method 500 proceeds to step S514 to generate an alarm. Otherwise (S512: no), method 500 returns to step S502 to continue capturing images inside vehicle 100 and then repeats steps S504-S512 to determine whether a conflict has occurred or will likely occur. In some embodiments, if the conflict detected in step S512 is detected persistently across multiple image frames captured by camera 110, the detection result may be confirmed. If the conflict detection is sporadic and analyses of other image frames show that no conflict exists, controller may disregard the conflict finding.

In step S514, controller 120 generates a control signal to trigger an alarm and sends the control signal to alarm receiver 130, which is the service platform or a police department. In some embodiments, the control signal may trigger a phone call or a data transmission to alarm receiver 130. For example, the data transmission may include, e.g., vehicle registration information, driver information, passenger information, vehicle location, and images that can show the conflict. In some embodiments, the control signal may cause a warning notice to be generated by alarm receiver 130, such as a pop-out window on a display screen of alarm receiver 130, a beeping sound, vibrating, or an audio alarm, etc.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed:

1. A method for detecting an inter-person conflict, comprising:
   receiving at least one image from an image data resource, wherein the at least one image is captured by at least one camera;

detecting human objects from the at least one image;
determining a distance between two of the detected human objects; and
determining whether there is a conflict between the two of the detected human objects based on the determined distance.

2. The method of claim 1, further comprising:
responsive to that there is a conflict, generating a control signal for triggering an alarm; and
transmitting the control signal to a device associated with an alarm receiver.

3. The method of claim 1, further comprising:
responsive to that there is a conflict, generating a control signal for triggering more images to be captured for the two of the detected human objects; and
transmitting the control signal to the at least one camera to trigger the at least one camera to capture more images for the two of the detected human objects.

4. The method of claim 1, further comprising:
responsive to that there is a conflict, generating a control signal for triggering data transmission to a device associated with an alarm receiver; and
transmitting data to the device associated with the alarm receiver according to the control signal.

5. The method of claim 4, wherein the transmitted data comprises user information of the two of the detected human objects.

6. The method of claim 4, wherein the transmitted data comprises location information associated with the conflict.

7. The method of claim 4, wherein the transmitted data comprises an image showing the two of the detected human objects.

8. The method of claim 1, wherein detecting human objects from the at least one image further comprises:
determining a region for each of the detected human objects.

9. The method of claim 8, wherein determining the distance between the two of the detected human objects comprises:
determining a relative position of the two determined regions for the two of the detected human objects; and
determining the distance between the two of the detected human objects based on the relative position of the two determined regions.

10. The method of claim 8, wherein determining the region for each of the detected human objects further comprises:
determining depth information of each of the detected human objects;
determining an object contour for each of the detected human objects; and
determining the region for each of the detected human objects based on the depth information and the object contour for each of the detected human objects.

11. method of claim 1, wherein determining whether there is a conflict between the two of the detected human objects based on the determined distance further comprises:
determining a probability of the conflict based on the determined distance; and
determining whether there is a conflict between the two of the detected human objects based on the determined probability of the conflict.

12. The method of claim 11, wherein the probability of the conflict is inversely proportional to the determined distance.

13. A system for detecting an inter-person conflict, comprising:
a processor; and
a non-transitory memory communicatively coupled to the processor, the memory storing a set of instructions that, when executed, cause the processor to implement operations comprising:
receiving at least one image from an image data resource, wherein the at least one image is captured by at least one camera;
detecting human objects from the at least one image;
determining a distance between two of the detected human objects; and
determining whether there is a conflict between the two of the detected human objects based on the determined distance.

14. The system of claim 13, wherein the operations, when executed by the processor, further comprises:
responsive to that there is a conflict, generating a control signal for triggering an alarm; and
transmitting the control signal to a device associated with an alarm receiver.

15. The system of claim 13, wherein the operations, when executed by the processor, further comprises:
responsive to that there is a conflict, generating a control signal for triggering more images to be captured for the two of the detected human objects; and
transmitting the control signal to the at least one camera to trigger the at least one camera to capture more images for the two of the detected human objects.

16. The system of claim 13, wherein the operations, when executed by the processor, further comprises:
responsive to that there is a conflict, generating a control signal for triggering data transmission to a device associated with an alarm receiver; and
transmitting data to the device associated with the alarm receiver according to the control signal.

17. The system of claim 16, wherein the transmitted data comprises user information of the two of the detected human objects.

18. The system of claim 16, wherein the transmitted data comprises location information associated with the conflict.

19. A non-transitory computer-readable medium, storing a set of instructions that, when executed by at least one processor, cause the at least one processor to perform a method for detecting an inter-person conflict, the method comprising:
receiving at least one image from an image data resource, wherein the at least one image is captured by at least one camera;
detecting human objects from the at least one image;
determining a distance between two of the detected human objects; and
determining whether there is a conflict between the two of the detected human objects based on the determined distance.

20. non-transitory computer-readable medium of claim 19, wherein the method further comprises:
responsive to that there is a conflict, generating a control signal for triggering an alarm; and
transmitting the control signal to a device associated with an alarm receiver.

* * * * *